US010054183B2

(12) United States Patent
Ogawa (10) Patent No.: US 10,054,183 B2
(45) Date of Patent: Aug. 21, 2018

(54) CYLINDER DEVICE

(71) Applicant: KYB Corporation, Tokyo (JP)

(72) Inventor: Takayuki Ogawa, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/122,732

(22) PCT Filed: Feb. 25, 2015

(86) PCT No.: PCT/JP2015/055460
§ 371 (c)(1),
(2) Date: Aug. 31, 2016

(87) PCT Pub. No.: WO2015/178056
PCT Pub. Date: Nov. 26, 2015

(65) Prior Publication Data
US 2017/0067527 A1    Mar. 9, 2017

(30) Foreign Application Priority Data

May 23, 2014  (JP) .................................. 2014-106934

(51) Int. Cl.
*F16F 9/34*      (2006.01)
*F16F 9/18*      (2006.01)
(Continued)

(52) U.S. Cl.
CPC ................ *F16F 9/34* (2013.01); *F16F 9/185* (2013.01); *F16F 9/32* (2013.01); *F16F 9/36* (2013.01)

(58) Field of Classification Search
CPC ........ F16F 9/18; F16F 9/32; F16F 9/34; F16F 9/36; F16F 9/38; F16F 9/46; F16F 9/185; F16F 9/364; F16F 9/516; F16F 9/19; F16F 9/006; F16F 9/06; F16F 9/5165; F16F 9/348; F16F 9/3235; F15B 7/006; F15B 2211/785; F15B 2211/7053; B61F 5/245
(Continued)

(56) References Cited

U.S. PATENT DOCUMENTS 3,960,251 A * 6/1976 Gorissen ................. F16F 9/446
                                                       188/286
4,139,186 A * 2/1979 Postema .............. B60G 17/005
                                                       188/322.19
(Continued)

FOREIGN PATENT DOCUMENTS

DE     102012021207     *  4/2014
JP     S60-237237 A       11/1985
(Continued)

*Primary Examiner* — Robert A. Siconolfi
*Assistant Examiner* — San M Aung
(74) *Attorney, Agent, or Firm* — Rabin & Berdo, P.C.

(57) ABSTRACT

A cylinder device includes a cylinder, an outer tube, a piston, a piston rod, a rod guide, a first common passage through which working oil that is supplied/discharged to/from a rod-side chamber passes, a pipe that forms a part of the first common passage and is provided in a reservoir tank, a pipe holder that is provided between the pipe and the rod guide and holds a first end of the pipe, and a plug that is provided on a side of the pipe holder opposite from the pipe and has a throttle passage allowing the first common passage to communicate with the reservoir tank.

15 Claims, 5 Drawing Sheets

(51) Int. Cl.
*F16F 9/36* (2006.01)
*F16F 9/32* (2006.01)

(58) Field of Classification Search
USPC .......... 188/315, 322.17, 318, 284, 285, 286,
188/322.13, 282.1; 269/32; 91/392, 395
See application file for complete search history.

(56) References Cited

U.S. PATENT DOCUMENTS

| | | | | |
|---|---|---|---|---|
| 5,618,248 | A | * 4/1997 | Huang | ............... A63B 21/0083 |
| | | | | 188/315 |
| 2002/0060104 | A1 | * 5/2002 | Nakazawa | ............... B62D 5/06 |
| | | | | 180/433 |
| 2004/0251097 | A1 | * 12/2004 | Barbison | ............... B60G 17/08 |
| | | | | 188/315 |
| 2013/0248306 | A1 | * 9/2013 | Ogawa | ..................... B61F 5/24 |
| | | | | 188/266.2 |
| 2014/0116826 | A1 | 5/2014 | Ogawa et al. | |

FOREIGN PATENT DOCUMENTS

| | | |
|---|---|---|
| JP | 2008-025694 A | 2/2008 |
| JP | 2009-287609 A | 12/2009 |
| JP | 2013-001306 A | 1/2013 |

* cited by examiner

CYLINDER DEVICE

TECHNICAL FIELD

The present invention relates to a cylinder device.

BACKGROUND ART

JP2008-25694A discloses a uniflow cylinder device in which a relief valve causing resistance to flow of working oil passing therethrough is provided on a bottom member that closes an end of an outer tube.

With the above-mentioned cylinder device, a reservoir tank is formed between an inner tube and the outer tube. In the reservoir tank, a pipe is disposed for guiding the working oil that has been discharged from a rod-side chamber to the bottom member. With this configuration, the working oil that has been discharged from the rod-side chamber is allowed to return to the reservoir tank through the relief valve provided on the bottom member.

SUMMARY OF INVENTION

With the above-mentioned cylinder device, because gas that has entered the inner tube is discharged from the rod-side chamber together with the working oil, the gas passes through the relief valve. Therefore, variations occur in differential pressure generated by the relief valve, and operation of the cylinder device may become unstable.

An object of the present invention is to stably operate a cylinder device.

According to one aspect of the present invention, a cylinder device includes an inner tube into which working fluid is filled, an outer tube provided so as to cover the inner tube, the outer tube forming a reservoir tank for retaining the working fluid between the outer tube and the inner tube, a piston slidably inserted into the inner tube, the piston partitioning an interior of the inner tube into a rod-side chamber and a piston-side chamber, a piston rod movably inserted into the inner tube, the piston rod being connected to the piston, a rod guide into which the piston rod is inserted, the rod guide closing first ends of the inner tube and the outer tube, a first common passage through which the working fluid passes, the working fluid being supplied/discharged to/from the rod-side chamber, a pipe provided in the reservoir tank, the pipe forming a part of the first common passage, a pipe holder provided between the pipe and the rod guide, the pipe holder holding an first end of the pipe, and a plug provided on a side of the pipe holder opposite from the pipe, the plug having a throttle passage, the throttle passage allowing the first common passage to communicate with the reservoir tank.

DESCRIPTION OF EMBODIMENT

A cylinder device 100 according to an embodiment of the present invention will be described below with reference to the attached drawings.

The cylinder device 100 is, for example, an actuator that suppresses vibration in left-right direction with respect to the traveling direction of a vehicle body by being interposed laterally between the vehicle body and a carriage in a railroad vehicle.

First, the cylinder device 100 will be described in outline with reference to FIG. 1.

The cylinder device 100 includes a cylinder 1 that is filled with working oil serving as working fluid, a piston 2 that is inserted into the cylinder 1 in a freely slidable manner to partition the interior of the cylinder 1 into a rod-side chamber 110 and a piston-side chamber 120, a piston rod 3 that is inserted into the cylinder 1 so as to be freely movable back and forth and connected to the piston 2, a reservoir tank 130 that retains the working oil, a first check valve 4 that is provided in a first passage 140 allowing the rod-side chamber 110 to communicate with the piston-side chamber 120 so as to allow the working oil to flow only from the piston-side chamber 120 to the rod-side chamber 110, a second check valve 5 that is provided in a second passage 150 allowing the reservoir tank 130 to communicate with the piston-side chamber 120 so as to allow the working oil to flow only from the reservoir tank 130 to the piston-side chamber 120, and a relief valve 6 that is provided in a third passage 160 allowing the rod-side chamber 110 to communicate with the reservoir tank 130 so as to adjust pressure in the cylinder 1 to a predetermined pressure.

In addition, the cylinder device 100 includes a first open/close valve 7 that is provided in a fourth passage 170 allowing the rod-side chamber 110 to communicate with the piston-side chamber 120 so as to open/close the fourth passage 170, a second open/close valve 8 that is provided in a fifth passage 180 allowing the piston-side chamber 120 to communicate with the reservoir tank 130 so as to open/close the fifth passage 180, a pump 9 that is provided in a sixth passage 190 allowing the rod-side chamber 110 to communicate with the reservoir tank 130 so as to supply the working oil from the reservoir tank 130 to the rod-side chamber 110, a motor 10 that drives the pump 9, and a third check valve 11 that is provided between the pump 9 provided in the sixth passage 190 and the cylinder 1 so as to allow the working oil to flow only from the pump 9 to the rod-side chamber 110.

The third passage 160, the fourth passage 170, and the sixth passage 190 are communicated with the rod-side chamber 110 through a first common passage 200 that supplies/discharges the working oil to/from the rod-side chamber 110. In addition, the fourth passage 170 and the fifth passage 180 are communicated with the piston-side chamber 120 through a second common passage 210 that supplies/discharges the working oil to/from the piston-side chamber 120. In addition, the second passage 150 and the fifth passage 180 are communicated with the piston-side chamber 120 through a third common passage 220 that supplies the working oil to the piston-side chamber 120.

Instead of being joined at the first common passage 200, the third passage 160, the fourth passage 170, and the sixth passage 190 may respectively be communicated with the rod-side chamber 110. Similarly, instead of being joined at the second common passage 210, the fourth passage 170 and the fifth passage 180 may respectively be communicated with the piston-side chamber 120, and instead of being joined at the third common passage 220, the second passage 150 and the fifth passage 180 may respectively be communicated with the piston-side chamber 120.

At an intermediate position of the first common passage 200, an orifice passage 15a that allows the rod-side chamber 110 to communicate with the reservoir tank 130 is provided. Details of the orifice passage 15a will be described later.

It is possible to operate the cylinder device 100 so as to extend by driving the pump 9 in a state in which the first open/close valve 7 is opened and the second open/close valve 8 is closed.

In this case, the rod-side chamber 110 is communicated with the piston-side chamber 120 through the fourth passage 170, and thereby, the working oil is supplied to the rod-side chamber 110 and the piston-side chamber 120, and the internal pressures in both chambers are increased equally.

Because the piston rod 3 is connected to the piston 2, a pressure receiving area of the piston 2 on the piston-side chamber 120 side is larger than that on the rod-side chamber 110 side. Therefore, when the pressure in the cylinder 1 is increased as described above, the cylinder device 100 exhibits an extending operation in which the piston 2 moves towards the rod-side chamber 110 and generates a thrust force that is the product of the pressure in the cylinder 1 and the area obtained by subtracting the pressure receiving area of the piston 2 on the rod-side chamber 110 side from the pressure receiving area of the piston 2 on the piston-side chamber 120 side.

At this time, when the pressure in the cylinder 1 is increased to a predetermined relief pressure, the relief valve 6 is opened. After being opened, the relief valve 6 generates the differential pressure at before and after the relief valve 6 by causing resistance to the flow of the working oil passing therethrough. The cylinder device 100 adjusts the pressure in the cylinder 1 to a predetermined relief pressure by causing resistance to the flow of the working oil passing through the third passage 160 with the relief valve 6.

In this embodiment, the relief valve 6 includes a proportional solenoid 6a so as to be able to control the relief pressure in a variable manner. Therefore, the cylinder device 100 can change the pressure in the cylinder 1 by changing the relief pressure of the relief valve 6, thereby changing the thrust force being generated.

In addition, it is possible to operate the cylinder device 100 so as to contract by driving the pump 9 in a state in which the first open/close valve 7 is closed and the second open/close valve 8 is opened.

In this case, the fourth passage 170 is blocked and the piston-side chamber 120 is communicated with the reservoir tank 130 through the fifth passage 180, and thereby, the working oil is supplied only to the rod-side chamber 110 to cause the internal pressure to increase.

Therefore, the cylinder device 100 exhibits contracting operation in which the piston 2 moves towards the piston-side chamber 120 side and generates a thrust force that is the product of the pressure receiving area of the piston 2 on the rod-side chamber 110 side and the pressure in the rod-side chamber 110.

In this embodiment, a cross-sectional area of the piston rod 3 is made half of a cross-sectional area of the piston 2, and the pressure receiving area of the piston 2 on the rod-side chamber 110 side is made half of the pressure receiving area of the piston 2 on the piston-side chamber 120. Thus, by equalizing the pressure in the rod-side chamber 110 when the cylinder device 100 is under the extending operation and the pressure in the rod-side chamber 110 when the cylinder device 100 is under the contracting operation, it is possible to equalize the thrust force generated by the cylinder device 100 under both extending operation and contracting operation. In addition, it is possible to equalize the flow rate of the working oil with respect to the displacement of the cylinder device 100.

With such a configuration, because the relief pressure of the relief valve 6 need not be changed if the same thrust force is to be generated by the cylinder device 100 under both extending and contracting operations, it is possible to simplify the control of the relief pressure. In addition, because the flow rate is equalized with respect to the displacement of the cylinder device 100 under both extending and contracting operations, it is possible to equalize the responsiveness with respect to generation of the thrust force by the cylinder device 100 under both extending and contracting operations.

If the pump 9 is not driven, the cylinder device 100 may be used as a passive damper by closing the first open/close valve 7 and the second open/close valve 8.

A case in which the cylinder device 100 is used as a passive damper will be described below.

When the cylinder device 100 is extended by external force, the piston 2 is moved towards the rod-side chamber 110 side to reduce the size of the rod-side chamber 110, thereby discharging the working oil by an amount equal to the volume of the rod-side chamber 110 reduced. At this time, the working oil is supplied from the reservoir tank 130 through the second passage 150 to the piston-side chamber 120 whose size has been increased by the movement of the piston 2 towards the rod-side chamber 110 side.

As described above, the third check valve 11 is provided between the pump 9 and the cylinder 1 in the sixth passage 190. Therefore, the working oil that has been discharged from the rod-side chamber no returns to the reservoir tank 130 through the third passage 160.

Because the relief valve 6 is provided in the third passage 160, in a case in which the cylinder device 100 is extended, the pressure in the rod-side chamber 110 is increased to the relief pressure that is set at the relief valve 6. Therefore, the cylinder device 100 generates damping force that is the product of the pressure receiving area of the piston 2 on the rod-side chamber 110 side and the pressure in the rod-side chamber 110.

When the cylinder device 100 is contracted by external force, the working oil is discharged from the rod-side chamber 110 by an amount equal to the volume of the piston rod 3 that has entered the cylinder 1.

In this case, because the first check valve 4 is opened and the rod-side chamber 110 is communicated with the piston-side chamber 120, the pressure in the rod-side chamber 110 and the pressure in the piston-side chamber 120 increase to the relief pressure that is set at the relief valve 6. Therefore, the cylinder device 100 generates damping force that is the product of the pressure in the cylinder 1 and the area obtained by subtracting the pressure receiving area of the piston 2 on the rod-side chamber 110 side from the pressure receiving area of the piston 2 on the piston-side chamber 120 side.

Figure 1:
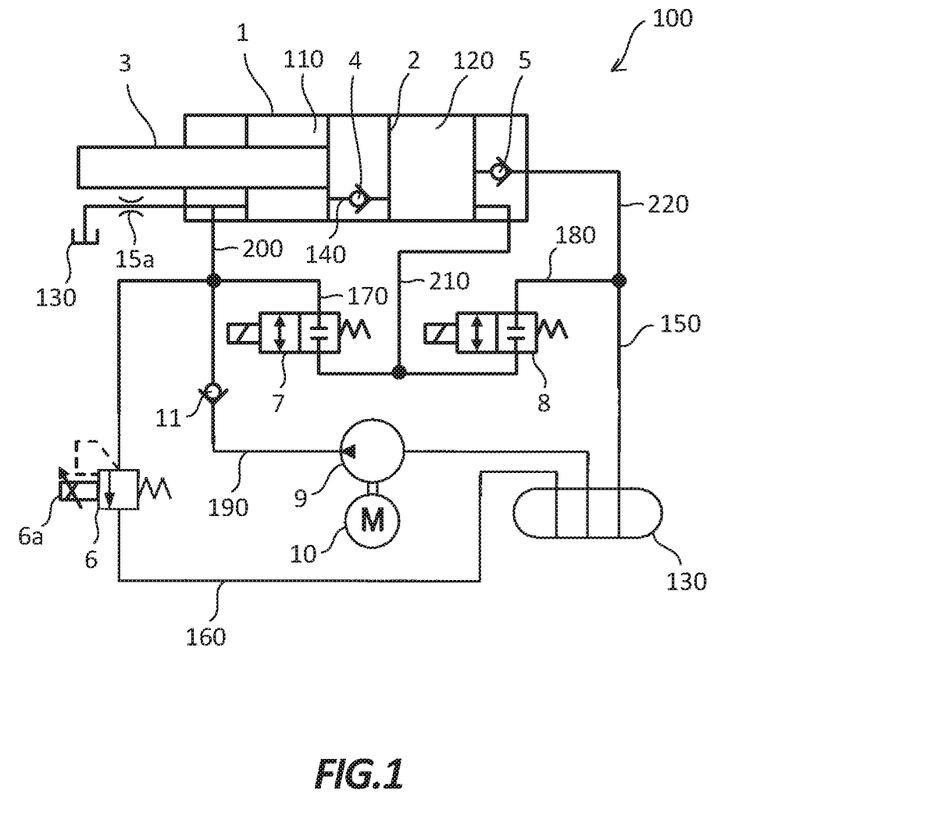
FIG. 1 is a circuit diagram in a case in which a cylinder device according to an embodiment of the present invention is an actuator.

As shown in FIG. 1, the first open/close valve 7 and the second open/close valve 8 of this embodiment are normally closed open/close valves. Therefore, when electric current is not supplied, the cylinder device 100 functions as a passive damper.

In addition, in this embodiment, as described above, the relief valve 6 includes the proportional solenoid 6a so as to be able to control the relief pressure in a variable manner. Therefore, the damping force of the cylinder device 100 can be controlled in a variable manner.

Figure 2:
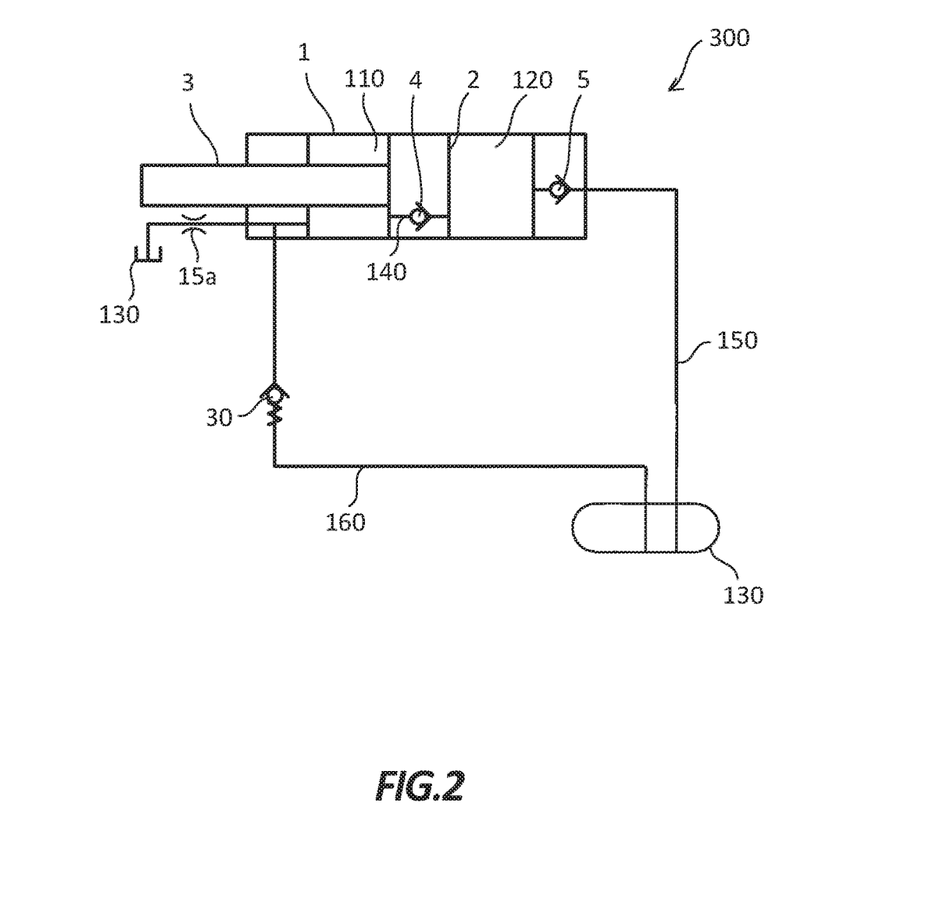
FIG. 2 is a circuit diagram in a case in which the cylinder device according to the embodiment of the present invention is a passive damper.

As shown in FIG. 2, the cylinder device 100 may also be configured as a passive damper 300.

In this case, in contrast to a case in which the cylinder device 100 is used as the actuator, the first common passage 200, the second common passage 210, the third common passage 220, the fourth passage 170, the fifth passage 180, the sixth passage 190, the first open/close valve 7, the second open/close valve 8, the pump 9, and the motor 10 are not required. In addition, a damping valve 30 is provided instead of the relief valve 6. The damping valve 30 is an element for generating damping force causing resistance to the flow of the working oil passing through the third passage 160. The other configurations are the same as those in the case in which the cylinder device 100 is used as the actuator.

Next, a specific configuration of the cylinder device 100 will be described with reference to FIGS. 3 and 4. Explanation of portions overlapping with the above-described outline explanation will be omitted.

Figure 3:
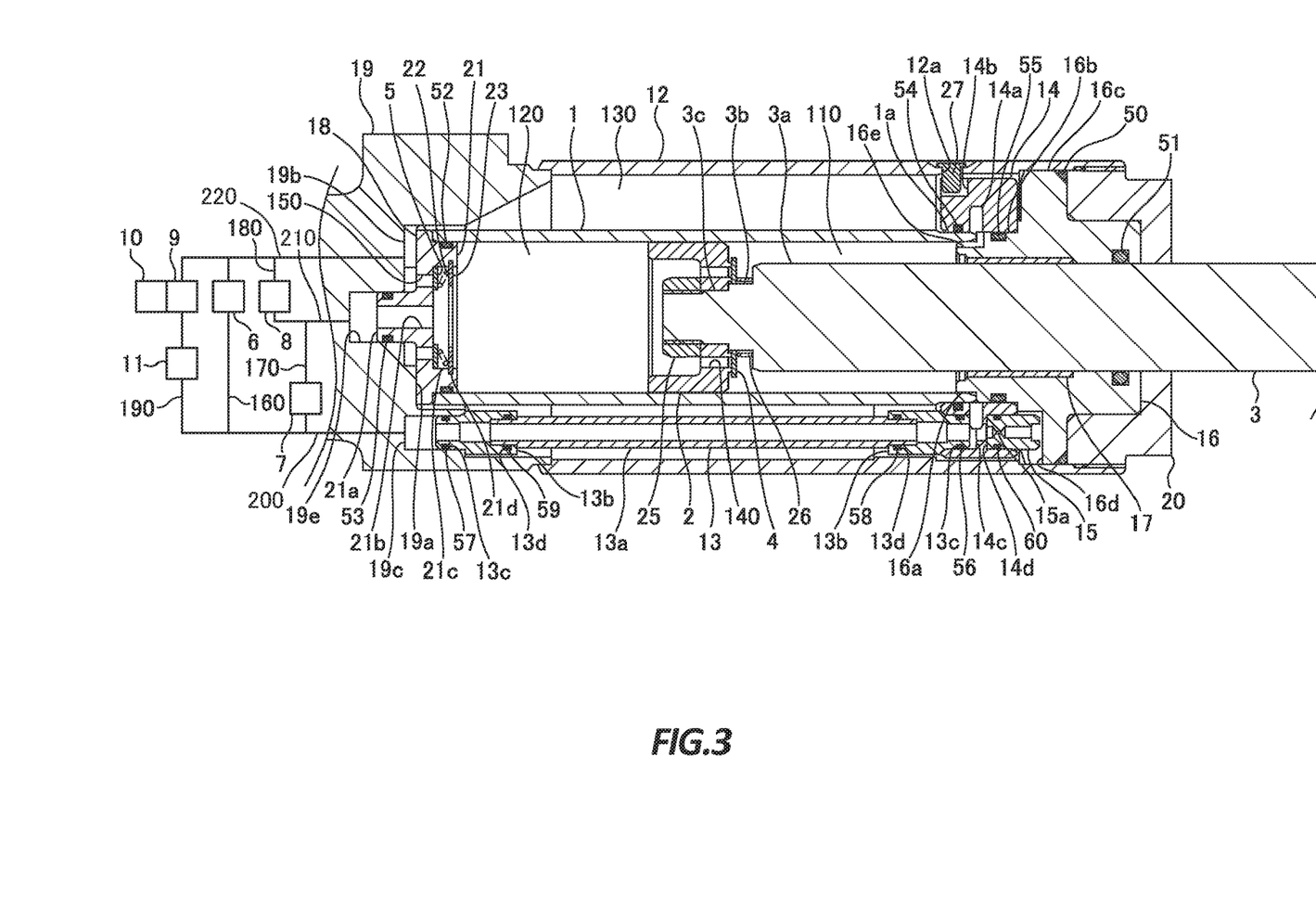
FIG. 3 is a sectional view of relevant portions of the cylinder device according to the embodiment of the present invention.

FIG. 3 is a sectional view of relevant portions of the cylinder device 100. FIG. 4 is a perspective view of the cylinder device 100.

As shown in FIG. 3, the cylinder device 100 includes an outer tube 12 that is disposed so as to cover the cylinder 1 serving as an inner tube such that the reservoir tank 130 is formed between the outer tube 12 and the cylinder 1, a pipe 13 that is disposed in the reservoir tank 130 so as to form a part of the first common passage 200, a pipe holder 14 that is fitted to an outer circumference of an end portion of the cylinder 1 on the rod-side chamber 110 side so as to hold an end portion of the pipe 13 on the rod-side chamber 110 side, and a plug 15 that is attached to the pipe holder 14.

Details will be described below.

End portions of the cylinder 1 and the outer tube 12 on the rod-side chamber 110 side are closed by an annular rod guide 16 that is fitted to an outer circumference of the piston rod 3.

The rod guide 16 has a press-fitted portion 16a that is press-fitted to an inner circumference of the cylinder 1, a large-diameter portion 16b whose diameter is larger than that of the press-fitted portion 16a, a flange portion 16c that coaxially positions the cylinder 1 relative to the outer tube 12, an engagement portion 16d that is formed on the flange portion 16c, and a cut-out portion 16e formed on a surface that is brought into contact with the cylinder 1 when the rod guide 16 is press-fitted to the cylinder 1. The rod guide 16 supports the piston rod 3 in a freely slidable manner via a bush 17 that is press-fitted to an inner circumference of the rod guide 16.

Seal members 50 and 51 for preventing leakage of the working oil to outside are provided between the rod guide 16 and the outer tube 12 and between the rod guide 16 and the piston rod 3, respectively.

A valve mechanism 18 is attached to an end portion of the cylinder 1 on the piston-side chamber 120 side. An end portion of the outer tube 12 on the piston-side chamber 120 side is closed by a bottom member 19.

On a bottom surface of the bottom member 19, a seat surface 19a on which the valve mechanism 18 is seated is provided. In addition, a cut-out portion 19b is provided on the seat surface 19a.

The third passage 160, the fifth passage 180, and the sixth passage 190 are connected to the cut-out portion 19b. In other words, the third passage 160, the fifth passage 180, and the sixth passage 190 are communicated with the reservoir tank 130 through the cut-out portion 19b.

An inserting hole 19c into which an end of the pipe 13 is inserted is provided on a surface of the bottom member 19 forming a part of the reservoir tank 130 between the cylinder 1 and the outer tube 12.

Figure 4:
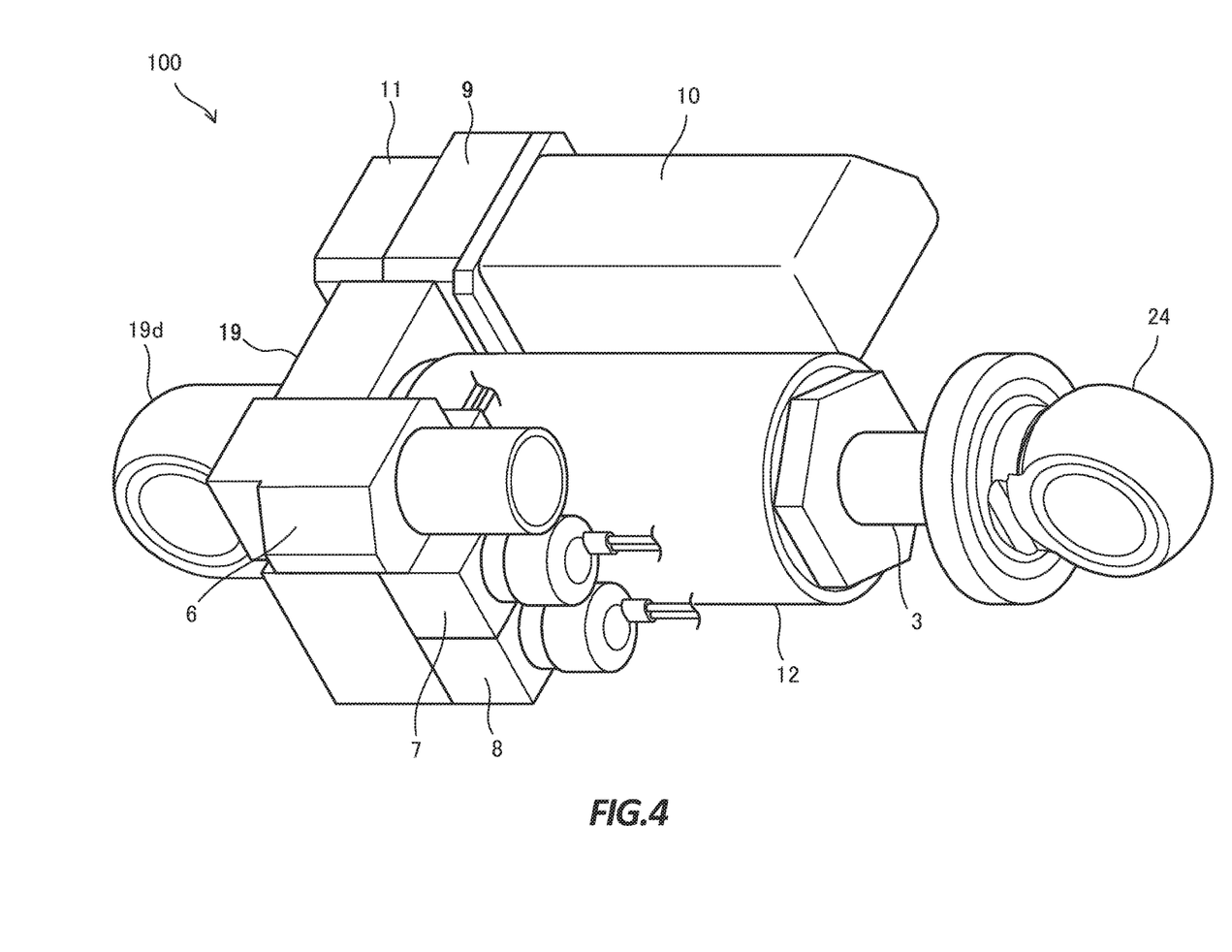
FIG. 4 is a perspective view of the cylinder device according to the embodiment of the present invention.

As shown in FIG. 4, the first open/close valve 7, the second open/close valve 8, the relief valve 6, the pump 9, the motor 10, and the third check valve 11 are fixed to the bottom member 19. In addition, an attachment part 19d for mounting the cylinder device 100 onto a vehicle body of a vehicle is provided on an end portion of the bottom member 19.

As shown in FIG. 3, a lock nut 20 is threaded to an opening of the outer tube 12 on the piston rod 3 side. The valve mechanism 18, the cylinder 1, and the rod guide 16 are held between the bottom member 19 and the lock nut 20.

The valve mechanism 18 includes a base 21, the second check valve 5, a spring 22, and a spring holding member 23.

The base 21 has a disk shape and has a circular tube portion 21a that is provided at the center portion so as to project towards the bottom member 19 side, a through hole 21b that penetrates the central portion, a recess 21c that is provided on the piston-side chamber 120 side, the second passage 150 that opens to a surface in contact with the seat surface 19a of the bottom member 19 and to a bottom surface of the recess 21c, and an annular groove 21d that is provided on an inner circumference of the recess 21c.

As described above, the cut-out portion 19b is provided on the seat surface 19a of the bottom member 19. Therefore, when the cylinder 1 attached with the valve mechanism 18 is seated on the bottom member 19, the reservoir tank 130 is communicated with the piston-side chamber 120 through the cut-out portion 19b and the second passage 150.

The second check valve 5 is an annular disk valve and is disposed in the recess 21c of the base 21 to close the second passage 150. The spring 22 is disposed on the piston-side chamber 120 side of the second check valve 5. The spring holding member 23 has an annular shape and is fitted to the annular groove 21d provided in the recess 21c. The spring 22 is compressed between the second check valve 5 and the spring holding member 23 such that the second check valve 5 is always biased towards the base 21 side.

As described above, with the valve mechanism 18, by employing annular members as the second check valve 5 and the spring holding member 23, the through hole 21b of the base 21 is not closed when the second check valve 5 and the spring holding member 23 are installed into the base 21.

The second check valve 5 is opened and closed by the differential pressure between the reservoir tank 130 and the piston-side chamber 120 during operation of the cylinder device 100, and allows the working oil to flow only from the reservoir tank 130 to the piston-side chamber 120.

In addition, in the bottom member 19, an inserting hole 19e into which the circular tube portion 21a of the base 21 is inserted when the valve mechanism 18 is seated onto the seat surface 19a is provided. The second common passage 210 is connected to the inserting hole 19e. In other words, the fourth passage 170 and the fifth passage 180 are communicated with the piston-side chamber 120 through the through hole 21b of the base 21.

Seal members 52 and 53 for preventing leakage of the working oil from the piston-side chamber 120 to the reservoir tank 130 are provided between the base 21 and the cylinder 1 and between the base 21 and the bottom member 19, respectively.

On an end portion of the piston rod 3 on the bottom member 19 side, a first small-diameter portion 3b whose diameter is smaller than a main body portion 3a and a second small-diameter portion 3c whose diameter is smaller than the first small-diameter portion 3b are provided. As shown in FIG. 4, an attachment member 24 for attaching the cylinder device 100 to a carriage of the vehicle is connected to the end portion of the piston rod 3 on the opposite side from the bottom member 19.

The piston 2 has the first passage 140 that is provided so as to open to the rod-side chamber 110 and the piston-side chamber 120, and the piston 2 is fixed to the second small-diameter portion 3c of the piston rod 3 by a nut 25. On the rod-side chamber 110 side of the piston 2, the first check valve 4 is disposed.

The first check valve 4 is an annular disk valve and closes the first passage 140 of the piston 2 by being held by an outer circumference of the first small-diameter portion 3b of the piston rod 3. A spring 26 is disposed between the first check valve 4 and the main body portion 3a of the piston rod 3 on an outer circumference of the first small-diameter portion 3b. The spring 26 is compressed between the first check valve 4 and the main body portion 3a such that the first check valve 4 is always biased towards the piston 2 side.

The first check valve 4 is opened and closed by the differential pressure between the rod-side chamber 110 and the piston-side chamber 120 during operation of the cylinder device 100, and allows the working oil to flow only from the piston-side chamber 120 to the rod-side chamber 110.

The pipe holder 14 is formed to have an annular shape. The pipe holder 14 has an annular groove 14a that is formed on an inner circumference thereof, an engagement portion 14b that is formed on an outer circumference thereof and engages with a positioning pin 27, an inserting hole 14c that is formed on the surface on the pipe 13 side and into which a first end of the pipe 13 is inserted, and an attaching hole 14d that is formed on the surface on the rod guide 16 side and into which the plug 15 is fitted.

A portion of an outer circumference of the cylinder 1 into which the pipe holder 14 is fitted is a small-diameter portion 1a having a diameter smaller than that of the other portions. In addition, as shown in FIG. 3, in a state in which the pipe holder 14 and the rod guide 16 are installed into the cylinder 1, the flange portion 16c of the rod guide 16 is located so as to approach an end surface of the pipe holder 14. With such a configuration, the position of the pipe holder 14 in the axial direction is defined.

The positioning pin 27 serving as a rotation-restricting member inserted into a through hole 12a of the outer tube 12 is engaged with the engagement portion 14b of the pipe holder 14. With such a configuration, relative rotation between the pipe holder 14 and the outer tube 12 is restricted. The positioning pin 27 is, for example, fixed to the outer tube 12 by brazing. When the positioning pin 27 is fixed, the through hole 12a of the outer tube 12 is closed by brazing.

In a state in which the relative rotation between the pipe holder 14 and the outer tube 12 is restricted by the positioning pin 27, the inserting hole 14c of the pipe holder 14 is provided so as to be located coaxially with the inserting hole 19c of the bottom member 19.

The annular groove 14a of the pipe holder 14 is located so as to face against the cut-out portion the of the rod guide 16. With such a configuration, the annular groove 14a is communicated with the rod-side chamber 110 through the cut-out portion 16e.

The large-diameter portion 16b of the rod guide 16 has the same diameter as the small-diameter portion 1a of the cylinder 1, and is fitted to the inner circumference of the pipe holder 14.

Seal members 54 and 55 for preventing leakage of the working oil from the annular groove 14a to the reservoir tank 130 are provided between the pipe holder 14 and the cylinder 1 and between the pipe holder 14 and the rod guide 16, respectively.

The pipe 13 includes a tube-shaped main body portion 13a and tube-shaped attachment members 13b that have greater thickness than the main body portion 13a and are respectively fitted to both ends of the main body portion 13a.

The first end of the pipe 13 is inserted into the inserting hole 14c of the pipe holder 14 and a second end of the pipe 13 is inserted into the inserting hole 19c of the bottom member 19, and thereby, the pipe 13 is held by the pipe holder 14 and the bottom member 19.

The inserting hole 14c of the pipe holder 14 opens to the annular groove 14a provided on the inner circumference of the pipe holder 14. Therefore, by inserting the pipe 13 into the inserting hole 14c of the pipe holder 14, the pipe 13 is communicated with the annular groove 14a.

As described above, in this embodiment, the rod-side chamber 110 is communicated with the pipe 13 by the annular groove 14a formed on the inner circumference of the pipe holder 14. With such a configuration, even if a communicating passage that allows the rod-side chamber 110 to communicate with the pipe 13 is formed by the pipe holder 14, it is possible to make the pipe holder 14 to have a shape that can be processed easily.

In addition, the first common passage 200 is connected to the inserting hole 19c of the bottom member 19, and by inserting the pipe 13 into the inserting hole 19c of the bottom member 19, the first common passage 200 is communicated with the pipe 13. With such a configuration, the first common passage 200 is communicated with the rod-side chamber 110 through the annular groove 14a of the pipe holder 14 and the pipe 13.

As described above, in this embodiment, the first common passage 200 provided on the bottom member 19 side is communicated with the rod-side chamber 110 through the pipe 13 provided in the reservoir tank 130. Therefore, as shown in FIG. 4, the relief valve 6, the first open/close valve 7, the pump 9, and the third check valve 11, which are provided in the third passage 160, the fourth passage 170, and the sixth passage 190, respectively, can be fixed to the bottom member 19 together with the second open/close valve 8 and the motor 10.

With such a configuration, it is possible to fix many parts in the vicinities of the attachment part 19d of the cylinder device 100 for attaching the cylinder device 100 to the vehicle body, and thus, it is possible to reduce a lateral force generated at the rod guide 16 when the cylinder device 100 is vibrated. Therefore, it is possible to improve durability of the cylinder device 100.

In addition, as described above, by disposing a part of the first common passage 200 that is communicated with the rod-side chamber no in the reservoir tank 130 as the pipe 13, it is possible to prevent the piping from being damaged by flying stones etc. during the vehicle is driven.

Seal members 56, 57, 58, and 59 for preventing leakage of the working oil from the pipe 13 to the reservoir tank 130 are provided between the attachment member 13b of the pipe 13 on the rod-side chamber 110 side and the pipe holder 14, between the attachment member 13b of the piston-side chamber 120 side and the bottom member 19, and between the main body portion 13a and two attachment members 13b, respectively.

Because general pipe materials have thin wall thickness, it may be difficult to form an annular groove for fitting, for example, a seal member such as O-ring thereto.

In contrast, in this embodiment, the attachment members 13b having greater thickness than the main body portion 13a are provided on both ends of the main body portion 13a of the pipe 13. Therefore, as shown in FIG. 3, by providing annular grooves 13c and 13d in the attachment members 13b, it is possible to easily provide the seal members 56, 57, 58, and 59 for preventing leakage of the working oil from the pipe 13 to the reservoir tank 130.

The plug 15 has a tube shape, and the orifice passage 15a is formed on an inner circumference thereof.

The attaching hole 14d of the pipe holder 14 is formed as a through hole that opens at the annular groove 14a provided in the inner circumference. Therefore, by fitting the plug 15 into the attaching hole 14d, the annular groove 14a is communicated with the reservoir tank 130 through the orifice passage 15a of the plug 15.

As shown in FIG. 3, the plug 15 is provided so as to protrude from a surface of the pipe holder 14 on the rod guide 16 side when fitted into the attaching hole 14d of the pipe holder 14. The portion of the plug 15 protruded from the pipe holder 14 is engaged with the engagement portion 16d of the rod guide 16.

A seal member 60 for preventing leakage of the working oil from a gap to the reservoir tank 130 is provided between the plug 15 and the pipe holder 14.

According to the above-mentioned configuration, when the working oil is discharged from the rod-side chamber 110 by operation of the cylinder device 100, a part of the working oil is discharged from the orifice passage 15a of the plug 15 to the reservoir tank 130 before passing through the pipe 13.

Because the differential pressure is generated between both ends of the orifice passage 15a, when gas is mixed into the working oil that has been discharged from the rod-side chamber 110, it is possible to efficiently discharge the gas from the orifice passage 15a to the reservoir tank 130.

As described above, the thrust force and the damping force generated by the cylinder device 100 are adjusted by a set pressure of the relief valve 6. Therefore, if the differential pressure is varied by the gas passing through the relief valve 6, the pressure in the cylinder 1 may be fluctuated and operation of the cylinder device 100 may become unstable.

In contrast, in this embodiment, as described above, it is possible to efficiently discharge, to the reservoir tank 130, the gas that has been discharged from the rod-side chamber 110. Therefore, it is possible to reduce the amount of the gas passing through the pipe 13 and reaching the relief valve 6 and to stabilize operation of the cylinder device 100.

The position of the plug 15 can be set arbitrarily on the circumference of the pipe holder 14. Here, as described in this embodiment, when the cylinder device 100 is mounted laterally, it is possible to directly discharge the working oil from the orifice passage 15a into the oil by setting the position of the plug 15 such that the orifice passage 15a opens at a position below an oil surface of the working oil retained in the reservoir tank 130, in other words, such that the orifice passage 15a opens at a position in the oil. With such a configuration, it is possible to suppress bubbling of the working oil retained in the reservoir tank 130 and mixing of the gas into the working oil.

In addition, when the position of the plug 15 is set so as to be coaxial with the pipe 13, the inserting hole 14c of the pipe holder 14 and the attaching hole 14d are also provided coaxially. With such a configuration, by the inserting hole 14c and the attaching hole 14d, a through hole opening at the surface on the pipe 13 side and the surface on the rod guide 16 side is formed in the pipe holder 14.

In this case, it is possible to assemble the pipe holder 14 to the cylinder device 100 by, for example, inserting a rod-shaped jig into the inserting hole 19c of the bottom member 19, by assembling the pipe 13 to the cylinder device 100 by inserting the pipe 13 into the jig, and next, by inserting the jig into the through hole, which is formed by the inserting hole 14c and the attaching hole 14d. With such a configuration, because it is possible to easily achieve positioning of the pipe 13 and the pipe holder 14, an assemblability of the cylinder device 100 is improved.

In addition, in this embodiment, because the portion of the plug 15 protruded from the pipe holder 14 is engaged with the engagement portion 16d of the rod guide 16, relative rotation between the pipe holder 14 and the rod guide 16 is restricted by the plug 15.

With such a configuration, because the relative rotation between the outer tube 12 and the pipe holder 14 is restricted by the positioning pin 27, the relative rotation between the rod guide 16 and the outer tube 12 is also restricted. Therefore, the relative positions of the outer tube 12, the pipe holder 14, and the rod guide 16 in the rotation direction can be set at any positions.

As described above, the gas that has entered the cylinder 1 is discharged from the cut-out portion 16e of the rod guide 16 to the annular groove 14a of the pipe holder 14. Therefore, in a case in which the cylinder device 100 is mounted laterally, in order to efficiently discharge the gas from the cylinder 1, the cut-out portion 16e of the rod guide 16 should be positioned at the position at which the gas is collected, in other words, at an upper portion of the cylinder 1.

Here, in the cylinder device 100, by threading the lock nut 20 to the opening of the outer tube 12, the valve mechanism 18, the cylinder 1, and the rod guide 16 are fixed in the outer tube 12. Therefore, for example, if the rod guide 16 is provided so as to be freely rotatable with respect to the outer tube 12, when the lock nut 20 is tightened, the rod guide 16 is also rotated together due to interfacial friction and it becomes difficult to provide the cut-out portion 16e at the desired position.

In contrast, in this embodiment, because the relative rotation between the outer tube 12 and the pipe holder 14 is restricted by the positioning pin 27, and the relative rotation between the pipe holder 14 and the rod guide 16 is restricted by the plug 15, the rotation of the rod guide 16 relative to the outer tube 12 is prevented when the lock nut 20 is tightened. Therefore, in the case in which the cylinder device 100 is mounted laterally, it is possible to position the cut-out portion 16e of the rod guide 16 at the upper potion and to efficiently discharge the gas that has entered the cylinder 1.

In addition, because the pipe holder 14 holds the first end of the pipe 13, if the pipe holder 14 is rotated during installation work to the cylinder device 100 and the phase between the inserting hole 14c of the pipe holder 14 and the inserting hole 19c of the bottom member 19 is deviated, there is a possibility that the pipe 13 will be detached from the inserting hole 14c and/or 19c.

In contrast, in this embodiment, because the relative rotation between the pipe holder 14 and the outer tube 12 is restricted by the positioning pin 27, it is possible to prevent the deviation of the phase between the inserting hole 14c of the pipe holder 14 and the inserting hole 19c of the bottom member 19. Therefore, it is possible to prevent the pipe 13 from being detached from the inserting hole 14c and/or 19c.

In addition, in this embodiment, by using the plug 15, which is provided to efficiently discharge the gas, the relative rotation between the pipe holder 14 and the rod guide 16 is restricted.

With such a configuration, by only providing, in addition, the positioning pin 27 restricting the relative rotation between the pipe holder 14 and the outer tube 12, it is possible to, while suppressing the number of parts and the cost increase, achieve a configuration in which the relative rotations among the outer tube 12, the pipe holder 14, and the rod guide 16 are restricted.

In addition, an end of the plug 15 is fitted to the attaching hole 14d of the pipe holder 14, and the portion of the plug 15 protruded from the pipe holder 14 is engaged with the engagement portion 16d of the rod guide 16. In other words, the plug 15 is provided such that its length becomes shorter than the lengths of the pipe holder 14 and the rod guide 16 in the axial direction. With such a configuration, it is possible to provide the plug 15 without increasing the length of the cylinder device 100 in the axial direction.

As described above, according to this embodiment, because the annular groove 14a of the pipe holder 14, which constitutes a part of the first common passage 200 and is communicated with the rod-side chamber 110 and the pipe 13, is communicated with the reservoir tank 130 by the orifice passage 15a formed in the plug 15, a part of the working oil that has been discharged from the rod-side chamber 110 is discharged to the reservoir tank 130 through the orifice passage 15a. At this time, because the differential pressure is generated between both ends of the orifice passage 15a, it is possible to efficiently discharge, to the reservoir tank 130 on the lower pressure side, the gas that has been mixed into the working oil and discharged from the rod-side chamber 110. Therefore, it is possible to reduce the amount of gas passing through the pipe 13 and reaching the relief valve 6 and to stabilize the operation of the cylinder device 100.

In addition, because a part of the first common passage 200 that is communicated with the rod-side chamber 110 is disposed in the reservoir tank 130 as the pipe 13, it is possible to prevent the piping from being damaged by flying stones etc. during the vehicle is driven.

In addition, when the position of the plug 15 is set so as to be coaxial with the pipe 13, the inserting hole 14c of the pipe holder 14 and the attaching hole 14d are provided coaxially. With such a configuration, by the inserting hole 14c and the attaching hole 14d, a through hole opening at the surface on the pipe 13 side and the surface on the rod guide 16 side is formed in the pipe holder 14.

In this case, it is possible to assemble the pipe holder 14 to the cylinder device 100 by, for example, inserting a rod-shaped jig into the inserting hole 19c of the bottom member 19, by assembling the pipe 13 to the cylinder device 100 by inserting the pipe 13 into the jig, and next, by inserting the jig into the through hole, which is formed by the inserting hole 14c and the attaching hole 14d. With such a configuration, because it is possible to easily achieve positioning of the pipe 13 and the pipe holder 14, an assemblability of the cylinder device 100 is improved.

In addition, the rod-side chamber 110 is communicated with the pipe 13 by the annular groove 14a that is formed on the inner circumference of the pipe holder 14. With such a configuration, even if a passage that allows the rod-side chamber 110 to communicate with the pipe 13 is formed by the pipe holder 14, it is possible to make the pipe holder 14 to have a shape that can be processed easily.

In addition, because the relative rotation between the outer tube 12 and the pipe holder 14 is restricted by the positioning pin 27, and the relative rotation between the pipe holder 14 and the rod guide 16 is restricted by the plug 15, the rotation of the rod guide 16 relative to the outer tube 12 is prevented when the lock nut 20 is tightened. Therefore, in the case in which the cylinder device 100 is mounted laterally, it is possible to position the cut-out portion the of the rod guide 16 at the upper potion and to efficiently discharge the gas that has entered the cylinder 1.

In addition, the plug 15 is provided such that the end of the plug 15 is fitted to the attaching hole 14d of the pipe holder 14, and the portion of the plug 15 protruded from the pipe holder 14 is engaged with the engagement portion 16d of the rod guide 16. In other words, the plug 15 is provided such that its length becomes shorter than the lengths of the pipe holder 14 and the rod guide 16 in the axial direction. With such a configuration, it is possible to provide the plug 15 without increasing the length of the cylinder device 100 in the axial direction.

In addition, because the pipe 13 is configured by providing, the attachment members 13b having greater thickness than the main body portion 13a on both ends of the main body portion 13a, by providing the annular grooves 13c and 13d in the attachment members 13b, it is possible to easily provide the seal members 56, 57, 58, and 59 for preventing leakage of the working oil from the pipe 13 to the reservoir tank 130.

In addition, because relative rotation between the pipe holder 14 and the outer tube 12 is restricted by the positioning pin 27, it is possible to prevent the deviation of the phase between the inserting hole 14c of the pipe holder 14 and the inserting hole 19c of the bottom member 19. Therefore, it is possible to prevent the pipe 13 from being detached from the inserting hole 14c and/or 19c.

In addition, because the relative rotation between the pipe holder 14 and the rod guide 16 is restricted by using the plug 15, which is provided to efficiently discharge the gas, by only additionally providing the positioning pin 27 restricting the relative rotation between the pipe holder 14 and the outer tube 12, it is possible to, while suppressing increase in the number of parts and the cost, achieve a configuration in which the respective relative rotation among the outer tube 12, the pipe holder 14, and the rod guide 16 is restricted.

Embodiments of this invention were described above, but the above embodiments are merely examples of applications of this invention, and the technical scope of this invention is not limited to the specific constitutions of the above embodiments.

For example, in the above-mentioned embodiment, although the relief valve 6 that causes resistance to the flow of the working oil passing through the third passage 160 is provided, depending on desired thrust force properties or damping force properties, a throttle valve with a disk valve etc. may be provided.

In addition, in the above-mentioned embodiment, although the third check valve 11 is provided in the sixth passage 190, the pump 9 may be a one-way pump that is not reverse-rotatable, or the pump 9 may be held by the motor 10 so as not to be rotatable, without providing the third check valve 11.

Figure 5:
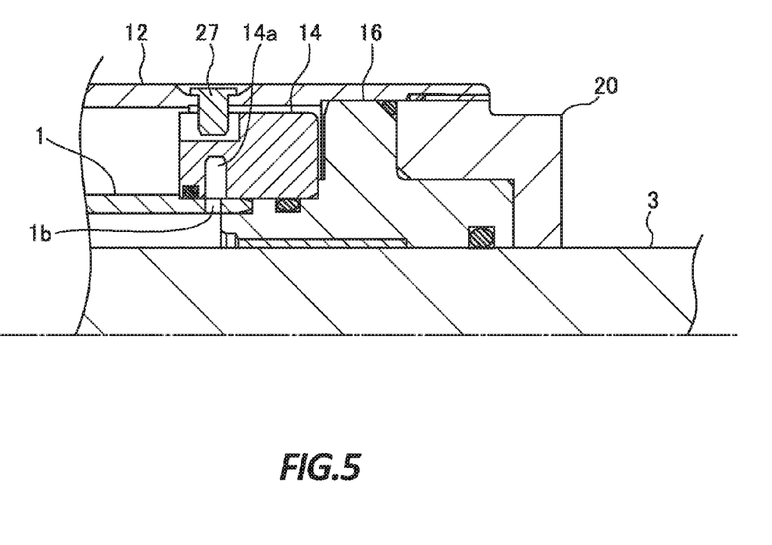
FIG. 5 is a diagram showing a modification of the cylinder device.

In addition, in the above-mentioned embodiment, although the rod-side chamber 110 is communicated with the annular groove 14a of the pipe holder 14 by the cut-out portion 16e provided on the rod guide 16, as shown in FIG.

5, the rod-side chamber 110 may be communicated with the annular groove 14a by providing a communicating hole 1b in the cylinder 1.

In addition, in the above-mentioned embodiment, as shown in FIG. 3, although the pipe 13 is positioned at a lower portion of the cylinder 1 when the cylinder device 100 is mounted laterally such that the cut-out portion 16e of the rod guide 16 is positioned at the upper portion of the cylinder 1, the pipe 13 need not be positioned at the lower portion. For example, if the position of the pipe 13 is set at a position under an oil surface in the reservoir tank 130 when the cylinder device 100 is extended to the utmost extent, it is possible to suppress ruffling of the oil surface due to vibration and to suppress entrance of the gas from the reservoir tank 130 into the cylinder 1.

In addition, in the above-mentioned embodiment, although the orifice passage 15a is provided in the plug 15, because the passage may be a throttle passage capable of producing the differential pressure, a choke passage may also be used.

In addition, in the above-mentioned embodiment, although the pump 9 is driven by the motor 10, driving means other than a motor may be used.

In addition, in the above-mentioned embodiment, although the working oil is used as the working fluid, any other kind of fluid, such as water, may also be used.

With respect to the above description, the contents of application No. 2014-106934, with a filing date of May 23, 2014 in Japan, are incorporated herein by reference.

The invention claimed is:

1. A cylinder device, comprising:
an inner tube into which working fluid is filled;
an outer tube provided so as to cover the inner tube, the outer tube forming a reservoir tank for retaining the working fluid between the outer tube and the inner tube;
a piston slidably inserted into the inner tube, the piston partitioning an interior of the inner tube into a rod-side chamber and a piston-side chamber;
a piston rod movably inserted into the inner tube, the piston rod being connected to the piston;
a rod guide into which the piston rod is inserted, the rod guide closing first ends of the inner tube and the outer tube;
a first common passage through which the working fluid passes, the working fluid being supplied/discharged to/from the rod-side chamber;
a pipe provided in the reservoir tank, the pipe forming a part of the first common passage;
a pipe holder provided between the pipe and the rod guide, the pipe holder holding a first end of the pipe;
a plug provided on a side of the pipe holder opposite from the pipe, the plug having a throttle passage, the throttle passage allowing the first common passage to communicate with the reservoir tank; and
a bottom member that closes second ends of the inner tube and the outer tube, the bottom member holding a second end of the pipe, wherein
the pipe includes
a main body portion, and
attachment members that are thicker than the main body portion, the attachment members being respectively fitted to both ends of the main body portion, and wherein
seal members are respectively provided between the attachment member on the rod-side chamber side and the pipe holder, between the attachment member on the piston-side chamber side and the bottom member, and between the attachment members and the main body portion.

2. A cylinder device, comprising:
an inner tube into which working fluid is filled;
an outer tube provided so as to cover the inner tube, the outer tube forming a reservoir tank for retaining the working fluid between the outer tube and the inner tube;
a piston slidably inserted into the inner tube, the piston partitioning an interior of the inner tube into a rod-side chamber and a piston-side chamber;
a piston rod movably inserted into the inner tube, the piston rod being connected to the piston;
a rod guide into which the piston rod is inserted, the rod guide closing first ends of the inner tube and the outer tube;
a first common passage through which the working fluid passes, the working fluid being supplied/discharged to/from the rod-side chamber;
a pipe provided in the reservoir tank, the pipe forming a part of the first common passage;
a pipe holder provided between the pipe and the rod guide, the pipe holder holding a first end of the pipe;
a plug provided on a side of the pipe holder opposite from the pipe, the plug having a throttle passage, the throttle passage allowing the first common passage to communicate with the reservoir tank; and
a rotation-restricting member that engages with the outer tube and the pipe holder and restricts relative rotation between the outer tube and the pipe holder.

3. The cylinder device according to claim 2, wherein the pipe and the plug are arranged coaxially via the pipe holder.

4. The cylinder device according to claim 2, further comprising
a communicating passage that allows the rod-side chamber to communicate with the pipe, wherein
the communicating passage is a groove formed in an inner circumference of the pipe holder.

5. The cylinder device according to claim 4, wherein
when the cylinder device is mounted laterally, the communicating passage is communicated with the rod-side chamber at an upper portion of the inner tube.

6. The cylinder device according to claim 2, further comprising
a fourth passage through which the working fluid passes, the working fluid being supplied/discharged to/from the piston-side chamber, wherein
the fourth passage is communicated with the rod-side chamber through the first common passage.

7. The cylinder device according to claim 6, further comprising:
a pump configured to supply the working fluid to the rod-side chamber and the piston-side chamber;
a motor configured to drive the pump;
a first open/close valve provided at an intermediate position of the fourth passage, the first open/close valve being configured to open/close the fourth passage;
a fifth passage that allows the piston-side chamber to communicate with the reservoir tank; and
a second open/close valve provided at an intermediate position of the fifth passage, the second open/close valve being configured to open/close the fifth passage.

8. The cylinder device according to claim 2, further comprising
a third passage that allows the rod-side chamber to communicate with the reservoir tank, and a relief valve provided at an intermediate position of the third passage, the relief valve being configured to cause resistance to flow of the working fluid passing through the third passage.

9. A cylinder device, comprising:

an inner tube into which working fluid is filled;

an outer tube provided so as to cover the inner tube, the outer tube forming a reservoir tank for retaining the working fluid between the outer tube and the inner tube;

a piston slidably inserted into the inner tube, the piston partitioning an interior of the inner tube into a rod-side chamber and a piston-side chamber;

a piston rod movably inserted into the inner tube, the piston rod being connected to the piston;

a rod guide into which the piston rod is inserted, the rod guide closing first ends of the inner tube and the outer tube;

a first common passage through which the working fluid passes, the working fluid being supplied/discharged to/from the rod-side chamber;

a pipe provided in the reservoir tank, the pipe forming a part of the first common passage;

a pipe holder provided between the pipe and the rod guide, the pipe holder holding a first end of the pipe; and a plug provided on a side of the pipe holder opposite from the pipe, the plug having a throttle passage, the throttle passage allowing the first common passage to communicate with the reservoir tank; wherein a through hole into which the plug is fitted is formed in the pipe holder, the plug is protruded from an end surface of the pipe holder when fitted into the through hole, and an engagement portion that engages with the plug is formed in the rod guide.

10. The cylinder device according to claim 9, wherein the pipe and the plug are arranged coaxially via the pipe holder.

11. The cylinder device according to claim 9, further comprising a communicating passage that allows the rod-side chamber to communicate with the pipe, wherein the communicating passage is a groove formed in an inner circumference of the pipe holder.

12. The cylinder device according to claim 11, wherein when the cylinder device is mounted laterally, the communicating passage is communicated with the rod-side chamber at an upper portion of the inner tube.

13. The cylinder device according to claim 9, further comprising a fourth passage through which the working fluid passes, the working fluid being supplied/discharged to/from the piston-side chamber, wherein the fourth passage is communicated with the rod-side chamber through the first common passage.

14. The cylinder device according to claim 13, further comprising:

a pump configured to supply the working fluid to the rod-side chamber and the piston-side chamber;

a motor configured to drive the pump;

a first open/close valve provided at an intermediate position of the fourth passage, the first open/close valve being configured to open/close the fourth passage;

a fifth passage that allows the piston-side chamber to communicate with the reservoir tank; and a second open/close valve provided at an intermediate position of the fifth passage, the second open/close valve being configured to open/close the fifth passage.

15. The cylinder device according to claim 9, further comprising a third passage that allows the rod-side chamber to communicate with the reservoir tank, and a relief valve provided at an intermediate position of the third passage, the relief valve being configured to cause resistance to flow of the working fluid passing through the third passage.

* * * * *